US012138950B1

(12) United States Patent
Tobias

(10) Patent No.: US 12,138,950 B1
(45) Date of Patent: Nov. 12, 2024

(54) IDENTIFYING INDICIA FOR USE WITH A SPIRAL NOTEBOOK

(71) Applicant: Charles Tobias, Vero Beach, FL (US)

(72) Inventor: Charles Tobias, Vero Beach, FL (US)

( * ) Notice: Subject to any disclaimer, the term of this patent is extended or adjusted under 35 U.S.C. 154(b) by 0 days.

(21) Appl. No.: 18/444,003

(22) Filed: Feb. 16, 2024

(51) Int. Cl.
*B42D 3/00* (2006.01)
*B42B 5/12* (2006.01)

(52) U.S. Cl.
CPC ................ *B42D 3/008* (2013.01); *B42B 5/12* (2013.01)

(58) Field of Classification Search
CPC ............. B42D 3/008; B42D 3/00; B42D 5/12
USPC .... 40/299.01, 725, 726; 281/5, 14, 15.1, 43, 281/45, 46; 283/61, 62, 63.1, 64, 72, 74, 283/79, 81, 98, 99, 100, 106
See application file for complete search history.

(56) References Cited

U.S. PATENT DOCUMENTS 1,410,976 A * 3/1922 Watkins .................. B42F 11/02 281/47
7,052,045 B2 5/2006 Park
7,406,790 B1 8/2008 Gnesa
10,685,589 B1 * 6/2020 Juzefczyk ............... G09F 23/10
2003/0230887 A1 * 12/2003 Roca ......................... B42B 5/08 281/21.1
2015/0052792 A1 * 2/2015 Iovine .................... B42D 3/008 402/3
2016/0347108 A1 * 12/2016 Condren ................. B42F 3/003

* cited by examiner

*Primary Examiner* — Justin V Lewis
(74) *Attorney, Agent, or Firm* — Birch, Stewart, Kolasch & Birch, LLP

(57) ABSTRACT

Identifying indicia for use with a spiral notebook having a predetermined length and thickness. An elongated member includes a first elongated portion and a second elongated portion. A retaining member is provided at an end of the first elongated portion for securing and locking the elongated member relative to spiral turns of a spiral notebook. Identifying indicia may be positioned on an outer surface of the first elongated portion. The elongated member is adapted to be retained, secured and locked relative to the outer surface of the spiral turns of the spiral notebook by inserting the second elongated portion within the spiral turns of the spiral notebook and looping the first elongated portion to be disposed on an outer surface of the elongated spiral of the spiral notebook with the end of the second elongated portion being inserted within the retaining member.

13 Claims, 5 Drawing Sheets

IDENTIFYING INDICIA FOR USE WITH A SPIRAL NOTEBOOK

BACKGROUND OF THE INVENTION

Field of the Invention

In a first embodiment of the present invention, an elongated member includes a first elongated portion and a second elongated portion. A retaining member is provided at the end of the first elongated portion for securing and locking the elongated member relative to the elongated spiral of the spiral notebook. The second elongated portion includes an end that is inserted into the retaining member for securing and locking the elongated member on the elongated spiral of the spiral notebook. Identifying indicia is placed on an outer surface of the first elongated portion. The elongated member is adapted to be retained, secured and locked relative to the elongated spiral of the spiral notebook by inserting the second elongated portion within the spiral turns of the spiral notebook and looping the first elongated portion to be disposed on an outer surface of the elongated spiral of the spiral notebook with the end of the second elongated portion being inserted within the retaining member. In this position the identifying indicia is visible on the outer surface of the elongated spiral of the spiral notebook to identify the contents of the spiral notebook. The first elongated portion, the second elongated portion, the identifying indicia and the retaining member are formed as one continuous piece. The elongated member may be constructed of metal, plastic or nylon.

A second embodiment of the present invention is directed to identifying indicia for use with a spiral notebook having a predetermined length and thickness. A strip of material is provided having a predetermined length and width. The predetermined length of the strip of material is selected based on the predetermined length of the spiral notebook. The predetermined width of the strip of material is selected based on the thickness of the spiral notebook. Identifying indicia is placed on the strip of material and the strip of material is retained on the spiral turns of the spiral notebook to identify the contents of the spiral notebook. The identifying indicia includes a retainer member secured to at least one end of the strip of material for retaining the strip of material relative to the spiral turns of the spiral notebook. The identifying indicia is secured on an outer surface of the elongated spirals of the notebook to identify the contents of the spiral notebook. The strip of material may be constructed of construction paper, cardboard, metal, plastic or nylon.

In a third embodiment of the present invention, the identifying indicia may include a first plurality of openings extending along the predetermined length of the strip of material, each of the first plurality of openings sequentially corresponding to an individual spiral forming an elongated spiral extending along one side of the spiral notebook. A second side of the strip of material may include a second plurality of openings extending along the predetermined length of the strip of material, each of the second plurality of openings sequentially corresponding to an individual spiral forming the elongated spiral extending along one side of the spiral notebook. The first plurality of openings is sequentially, selectively positioned on a first side of said corresponding individual spirals of the elongated spiral and the second plurality of openings is sequentially, selectively positioned on a second side of the corresponding individual spirals of the elongated spiral so that the identifying indicia is placed on the strip of material and the strip of material is adapted to be retained relative to the spiral notebook by said first and second plurality of openings engaging with corresponding individual spirals of the elongated spirals of the notebook. The identifying indicia is secured on an outer surface of the elongated spirals of the notebook to identify the contents of the spiral notebook. The strip of material may be constructed of construction paper, cardboard, metal, plastic or nylon.

DESCRIPTION OF BACKGROUND ART

Spiral notebooks have been available for many years. A spiral notebook includes a cover wherein an individual may insert some indicia on the cover to identify the contents of the spiral notebook. However, when the spiral notebook is place upright on a shelf it is normally not possible to see the indicia printed on the cover in view of the fact that the spiral notebook is stacked relative to adjacent spiral notebooks or books. Thus, an individual has to remove one or more spiral notebooks or books from the shelf to be able to see the cover of the spiral notebook or to be able to open the spiral notebook to ascertain the contents of a particular spiral notebook relating to a particular topic of interest.

SUMMARY AND OBJECTS OF THE INVENTION

An object of a first embodiment of the present invention is to provide an elongated member with a first elongated portion and a second elongated portion. A retaining member is provided at the end of the first elongated portion for securing and locking the elongated member relative to the elongated spiral of the spiral notebook. The second elongated portion includes an end that is inserted into the retaining member for securing and locking the elongated member on the spiral turns of the spiral notebook.

An object of the first embodiment is to provide identifying indicia that is placed on an outer surface of the first elongated portion. The elongated member is adapted to be retained, secured and locked relative to the spiral turns of the spiral notebook by inserting the second elongated portion within the spiral turns of the spiral notebook and looping the first elongated portion to be disposed on an outer surface of the spiral turns of the spiral notebook with the end of the second elongated portion being inserted within the retaining member. In this position the identifying indicia is visible on the outer surface of the spiral turns of the spiral notebook to identify the contents of the spiral notebook.

An object of the first embodiment of the present invention is to provide the first elongated portion, the second elongated portion, the identifying indicia and the retaining member as being formed as one continuous piece.

Another object of the first embodiment is to provide the elongated member with a reduced thickness portion at approximately half the length of the elongated member for enabling the elongated member to be bent and to be retained adjacent to an inner surface of the spiral turns of the spiral notebook to avoid interference with the turning of pages in the spiral notebook.

An object of the first embodiment of the present invention is to construct the first and second elongated portions from plastic or nylon on which the indicia is placed.

It is an object of a second embodiment of the present invention to provide identifying indicia for use with a spiral notebook to permit an individual to determine the contents of the spiral notebook without removing the spiral notebook from a shelf.

An object of the second embodiment of the present invention is to provide a strip of material having a predetermined length and width corresponding to a predetermined length and thickness of the spiral notebook.

Another object of the second embodiment of the present invention is to place identifying indicia on the strip of material and the strip of material is retained on the outer surface of the spiral turns of the spiral notebook to identify the contents of the spiral notebook.

A further embodiment of the second embodiment of the present invention may include a retainer member secured to at least one end of the strip of material for retaining the strip of material relative to the spiral turns of the spiral notebook.

An object of the second embodiment of the present invention is to construct the strip of material from construction paper, cardboard, metal, plastic or nylon on which the indicia is placed.

An object of a third embodiment of the present invention is to provide identifying indicia on a strip of material with a first plurality of openings extending along the predetermined length of the strip of material, each of the first plurality of openings sequentially correspond to an individual spiral forming an elongated spiral extending along one side of the spiral notebook. A second side of the strip of material includes a second plurality of openings extending along the predetermined length of the strip of material, each of the second plurality of openings sequentially correspond to an individual spiral forming the elongated spiral extending along one side of the spiral notebook. The first plurality of openings is sequentially, selectively positioned on a first side of said corresponding individual spirals of the elongated spiral and the second plurality of openings is sequentially, selectively positioned on a second side of the corresponding individual spirals of the elongated spiral so that the identifying indicia is placed on the strip of material and the strip of material is adapted to be retained relative to the spiral notebook by said first and second plurality of openings engaging with corresponding individual spirals of the elongated spirals of the notebook. The identifying indicia is secured on an outer surface of the elongated spirals of the notebook to identify the contents of the spiral notebook.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
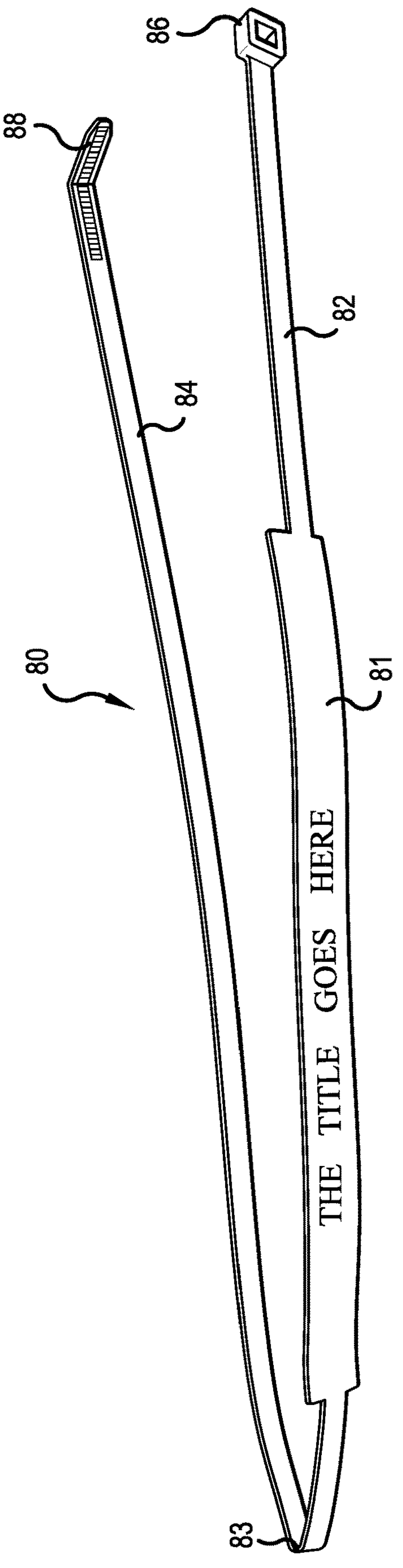
FIG. 1 is a view of the first embodiment of the present invention wherein an elongated member is formed of a first elongated portion, a second elongated portion, the identifying indicia and a retaining member as one continuous piece for securing the elongated member on the outer surface of the spiral turns of a spiral notebook to identify the contents of the spiral notebook.
Figure 2:
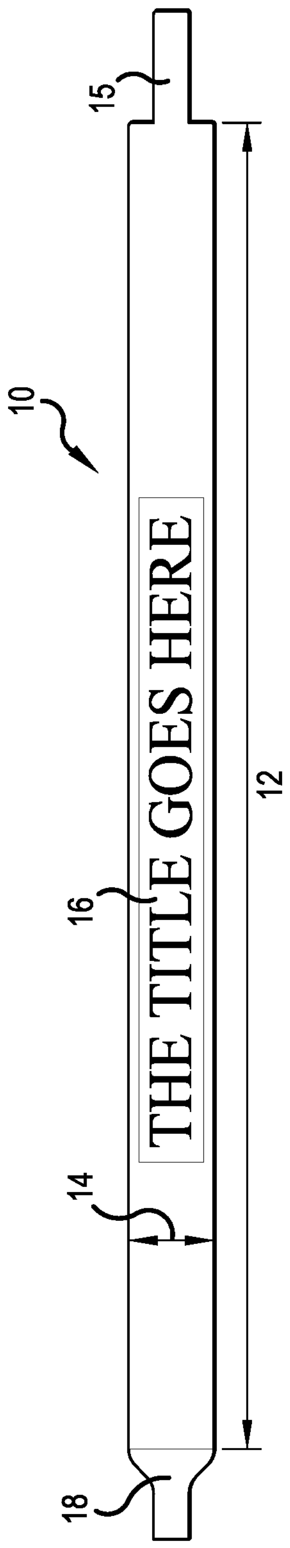
FIG. 2 is a view of the second embodiment of the present invention wherein a strip of material including identifying indicia placed thereon.

FIG. 1 illustrates a first embodiment of the present invention wherein an elongated member 80 includes a first elongated portion 82 and a second elongated portion 84. A retaining member 86 is provided at the end of the first elongated portion 82 for securing and locking the elongated member 80 relative to the spiral turns of the spiral notebook. The second elongated portion 84 includes an end 88 that is inserted into the retaining member 86 for securing and locking the elongated member 80 on the elongated spiral of the spiral notebook. Identifying indicia 81 is either written on or a label is applied to an enlarged section of the one piece elongated member 80 that is formed on the first elongated portion 82. The elongated member 80 is adapted to be retained, secured and locked relative to the spiral turns of the spiral notebook by inserting the second elongated portion 84 within the spiral turns of the spiral notebook and looping the first elongated portion 82 to be disposed on an outer surface of the spiral turns of the spiral notebook with the end 88 of the second elongated portion 84 being inserted within the retaining member 86. The section of the second elongated portion 84 adjacent to the end 88 may include a reduced thickness portion to permit bending of the end 88 for insertion into the retaining member 86. In this position the identifying indicia 81 is visible on the outer surface of the spiral turns of the spiral notebook to identify the contents of the spiral notebook.

The elongated member 80 is formed of the first elongated portion 82, the second elongated portion 84, the identifying indicia 81 and the retaining member 86 as one continuous piece.

The elongated member 80 includes a reduced thickness portion 83 at approximately half the length of the elongated member 80 for enabling the elongated member 80 to bend and to be retained adjacent to an inner surface of the spiral turns of the spiral notebook to avoid interference with the turning of pages in the spiral notebook.

The elongated member may be constructed of plastic or nylon as one continuous piece of material. The identifying indicia can be written on, printed on or attached via a label onto the enlarged section 81 of the elongated member.

As illustrated in FIGS. 2, 2A, 3 and 4, identifying indicia is provided for use with a spiral notebook 20 having a predetermined length 22, a predetermined width 24 and a thickness 26. A strip of material 10 is provided having a predetermined length 12 and width 14. The predetermined length 12 of the strip of material 10 is selected based on the predetermined length 22 of the spiral notebook 20. The predetermined width 14 of the strip of material 10 is selected based on the thickness 26 of the spiral notebook 20. Identifying indicia 16 is placed on the strip of material 10 and the strip of material 10 is adapted to be retained on an outer surface of the spiral turns 28 of the spiral notebook 20 to enable an individual to see the identifying indicia written on, or printed on or applied by a label thereon.

The identifying indicia 16 may include a retainer member 18 secured to at least one end of the strip of material 10 for retaining the strip of material 10 relative to the spiral turns 28 of the spiral notebook 20. The retainer member 18 is folded beneath the strip of material 10 to form a locking device for securing the strip of material 10 relative to the outer surface of the spiral turns 28 of the spiral notebook 20. In addition, a second retainer member 15 is folded beneath the strip of material 10 to form a locking device for securing the strip of material 10 relative to the outer surface of the spiral turns 28 of the spiral notebook 20.

Figure 3:
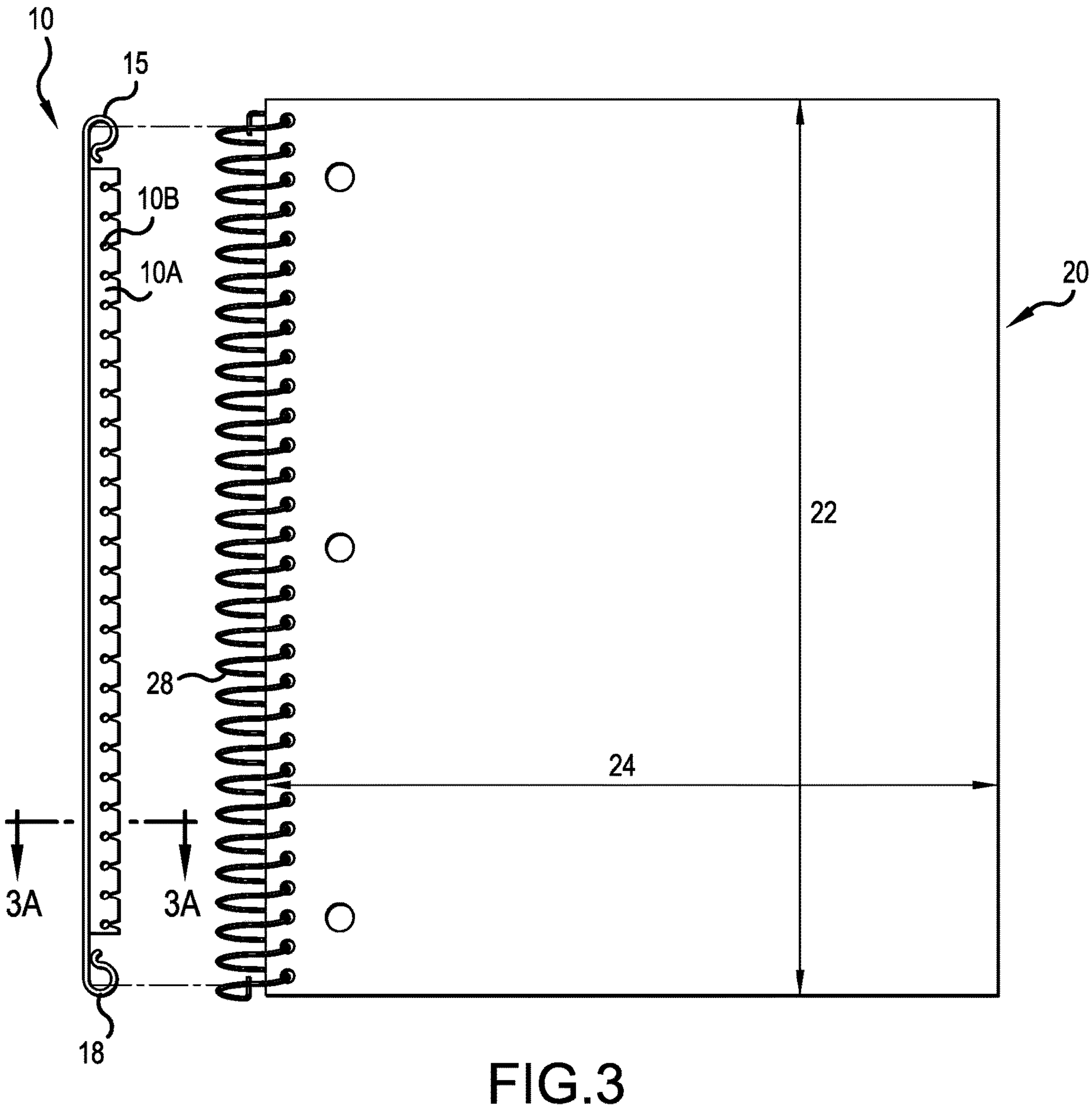
FIG. 3 is a view of the second embodiment taken together with FIG. 2 wherein a spiral notebook with a strip of material including identifying indicia is aligned to be positioned on the spiral turns of the spiral notebook.

FIG. 3 illustrates a side view of the strip of material 10 with a spline 10A extending from one surface of the strip of material 10 wherein openings 10B are provided for engaging and locking with individual spiral turns 28 of the spiral notebook 20.

Figure 3A:
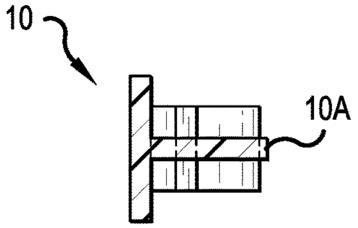
FIG. 3A is a cross-sectional view of the strip of material as illustrated in FIG. 3 taken along line 3A-3A.

FIG. 3A illustrates a cross-sectional view taken along line 3A-3A of the strip of material 10 with a spline 10A extending from one surface of the strip of material 10 for engaging and locking with individual spiral turns 28 of the spiral notebook 20.

Figure 5:
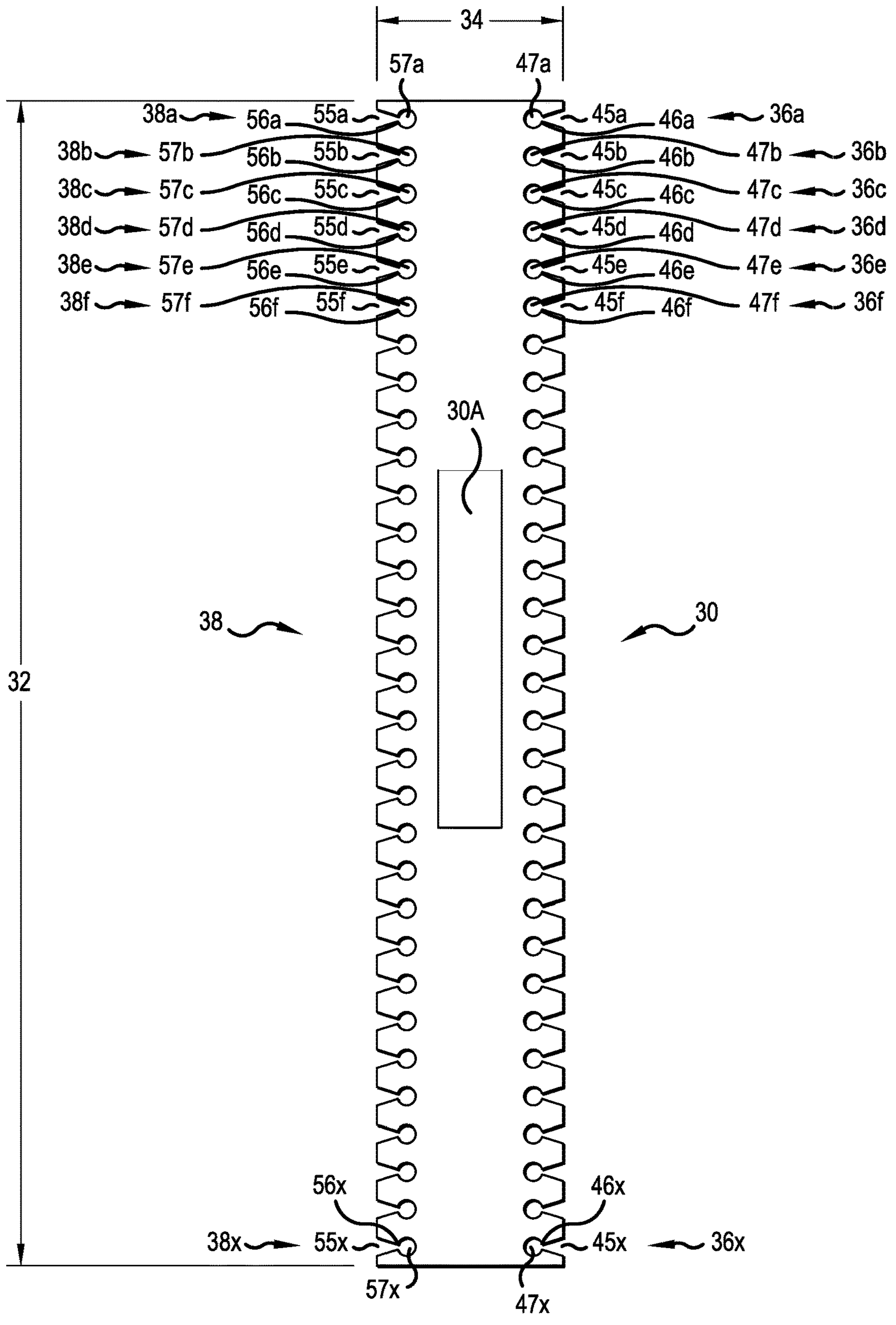
FIG. 5 is a view of a third embodiment of the present invention wherein comb-like teeth are positioned on each side of a strip of material for securing the strip of material including identifying indicia placed thereon on the outer surface of the spiral turns of a spiral notebook.

A third embodiment is illustrated with reference to FIG. 5, wherein a strip of material 30 has a predetermined length 32, a width 34, a first side 36 and a second side 38. The predetermined length 32 of said strip of material 30 is selected based on the predetermined length 22 of the spiral notebook 20. The predetermined width 34 of said strip of material 30 is selected based on the thickness 26 of the spiral notebook 20.

Figure 4:
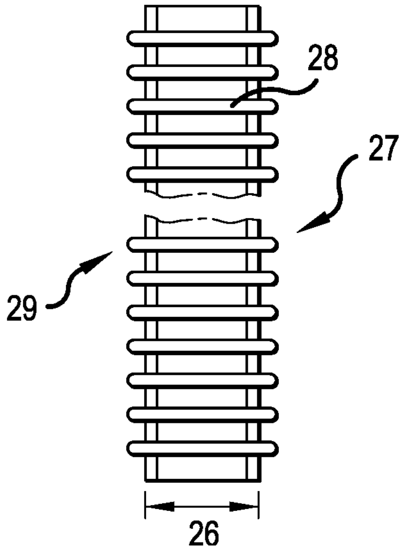
FIG. 4 is a side view of the spiral notebook illustrating the thickness of the spiral notebook.

The first side 36 of said strip of material 30 includes a first plurality of openings **36*a*-36*x* extending along the predetermined length 32 of said strip of material 30. Each of said first plurality of openings 36*a*-36*x* sequentially corresponds to an individual spiral forming an elongated spiral 28 extending along a first side 27 of the spiral notebook 20 as illustrated in FIG. 4**.

The second side 38 of said strip of material 30 includes a second plurality of openings **38*a*-38*x* extending along the predetermined length 32 of said strip of material 30. Each of said second plurality of openings 38*a*-38*x* sequentially corresponds to an individual spiral forming the elongated spiral 28 extending along a second side 29 of the spiral notebook 20 as illustrated in FIG. 4**.

The first plurality of openings **36*a*-36*x* includes a wide initial opening 45*a*-45*x* that narrows at a point 46*a*-46*x* and then opens into an opening 47*a*-47*x* that will mate with a corresponding individual spiral forming the elongated spiral 28 on the first side 27 of the elongated spiral 28. The second plurality of openings 38*a*-38*x* includes a wide initial opening 55*a*-55*x* that narrows at a point 56*a*-56*x* and then opens into the respective opening 57*a*-57*x* that will mate with a corresponding individual spiral on the second side 29 of the elongated spiral 28 as illustrated in FIG. 4**.

The first plurality of openings **36*a*-36*x* is sequentially, selectively positioned on the first side 27 of said corresponding individual spirals of said elongated spiral 28 and is snaped into position on the elongated spiral 28 and said second plurality of openings 38*a*-38*x* is sequentially, selectively positioned on the second side 29 of said corresponding individual spirals of said elongated spiral 28 and is snaped into position on the elongated spiral 28**.

Identifying indicia is written on, or printed on or applied by a label on said strip of material 30 and said strip of material 30 is adapted to be retained relative to the spiral notebook by said first plurality of openings **36*a*-36*x* snaped into position on the first side 27 of the elongated spiral 28 and second plurality of openings 38*a*-38*x* snaped into position on the second side 29 of the on the elongated spiral 28 with the strip of material 30 being curved over the exterior surface of the elongated spiral 28** to enable an individual to see the identifying indicia written on, or printed on or applied by a label thereon.

The strip of material 30 may be curved to fit the particular thickness of the spiral notebook 30. In addition, the strip of material 30 may include a pocket 30A for slipping identifying indicia into the pocket or removing identifying indicia from the pocket to identify and keep current a label for a particular spiral notebook 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Identifying indicia adapted for use with a spiral notebook having a predetermined length and thickness comprising:

- an elongated member formed as one continuous piece including a first elongated portion and a second elongated portion;
- a retaining member being positioned at an end of the first elongated portion for securing and locking the elongated member relative to spiral turns of a spiral notebook;
- said second elongated portion including an end for insertion into the retaining member for securing and locking the first elongated portion on an outer surface of the spiral turns of the spiral notebook;
- identifying indicia being adapted to be written on, printed on, applied by a label on an outer surface of the first elongated portion;
- said elongated member being adapted to be retained, secured and locked relative to the outer surface of the spiral turns of the spiral notebook by inserting the second elongated portion within the spiral turns of the spiral notebook and looping the first elongated portion to be disposed on the outer surface of the spiral turns of the spiral notebook with the end of the second elongated portion being inserted within the retaining member wherein the identifying indicia visible on the outer surface of the spiral turns of the spiral notebook to identify contents of the spiral notebook.

2. Identifying indicia according to claim 1, wherein the elongated member includes an enlarged section formed on the first elongated portion wherein the identifying indicia is written on, printed on, applied by a label on an outer surface of the enlarged section on the first elongated portion.

3. Identifying indicia according to claim 1, wherein the elongated member includes a reduced thickness portion formed along a length of the elongated member for enabling the elongated member to be bent and to be retained adjacent to an inner surface of the spiral turns of the spiral notebook to avoid interference with a turning of pages in the spiral notebook.

4. Identifying indicia according to claim 1, wherein the elongated member is selected from the group consisting of metal, plastic and nylon.

5. Identifying indicia according to claim 1, wherein said identifying indicia is selected from the group consisting of printing, stamping, and embossing.

6. Identifying indicia adapted for use with a spiral notebook having a predetermined length and thickness comprising:

a strip of material having a predetermined length and width;

said predetermined length of said strip of material being selected based on the predetermined length of the spiral notebook;

said predetermined width of said strip of material being selected based on the thickness of the spiral notebook; and a spline including a plurality of spaced apart engaging openings extending along a length of said spline, said spline being secured to one side of the strip of material;

a retainer member secured to a first end and a second end of the strip of material for retaining said strip of material relative to the spiral turns of the spiral notebook, said retainer member being a locking member extending beneath the strip of material for securing the strip of material relative to the spiral turns of the spiral notebook;

wherein identifying indicia may be written on, printed on, applied by a label on said strip of material and said strip of material being retained on an outer surface of spiral turns of the spiral notebook by selectively engaging the plurality of spaced apart openings in the spline to fit on corresponding predetermined spiral turns of the spiral notebook to identify contents of the spiral notebook.

7. Identifying indicia according to claim 6, wherein said strip of material is-being selected from the group consisting of construction paper, cardboard, metal, plastic and nylon.

8. Identifying indicia according to claim 6, wherein said identifying indicia is being selected from the group consisting of printing, stamping, and embossing.

9. Identifying indicia adapted for use with a spiral notebook having a predetermined length and thickness comprising:

a strip of material having a predetermined length, width, a first side and a second side;

said predetermined length of said strip of material being selected based on the predetermined length of the spiral notebook;

said predetermined width of said strip of material being selected based on the thickness of the spiral notebook;

said first side of said strip of material including a first plurality of openings extending along the predetermined length of said strip of material, each of said first plurality of openings sequentially corresponding to an individual spiral forming an elongated spiral extending along a first side of the spiral notebook; and said second side of said strip of material including a second plurality of openings extending along the predetermined length of said strip of material, each of said second plurality of openings sequentially corresponding to said individual spiral forming the elongated spiral extending along a second side of the spiral notebook;

wherein said first plurality of openings is sequentially, selectively positioned on a first side of said corresponding individual spirals of said elongated spiral and said second plurality of openings is sequentially, selectively positioned on a second side of said corresponding individual spirals of said elongated spiral;

wherein identifying indicia may be written on, printed on, applied by a label on said strip of material and said strip of material is adapted to be retained relative to the spiral notebook by said first and second plurality of openings;

wherein said strip of material includes a pocket for inserting identifying indicia therein and for removing identifying indicia therefrom.

10. Identifying indicia according to claim 9, wherein said strip of material is selected from the group consisting of construction paper, cardboard, metal, plastic and nylon.

11. Identifying indicia according to claim 9, wherein said identifying indicia is selected from the group consisting of printing, stamping and embossing.

12. Identifying indicia according to claim 9, wherein said strip of material is-being curved to correspond with the thickness of the spiral notebook.

13. Identifying indicia adapted for use with a spiral notebook having a predetermined length and thickness comprising:

an elongated member including a first elongated portion and a second elongated portion;

a retaining member being provided at an end of the first elongated portion for securing and locking the elongated member relative to spiral turns of a spiral notebook;

said second elongated portion including an end for insertion into the retaining member for securing and locking the first elongated portion on an outer surface of the spiral turns of the spiral notebook;

identifying indicia may be written on, printed on, applied by a label on an outer surface of the first elongated portion;

said elongated member being adapted to be retained, secured and locked relative to the outer surface of the spiral turns of the spiral notebook by inserting the second elongated portion within the spiral turns of the spiral notebook and looping the first elongated portion to be disposed on the outer surface of the spiral turns of the spiral notebook with the end of the second elongated portion being inserted within the retaining member for positioning the identifying indicia to be visible on the outer surface of the spiral turns of the spiral notebook to identify contents of the spiral notebook;

said elongated member including the first elongated portion, the second elongated portion, the identifying indicia and the retaining member being formed as one continuous piece, and the elongated member including a reduced thickness portion formed along a length of the elongated member for enabling the elongated member to be bent and to be retained adjacent to an inner surface of the spiral turns of the spiral notebook to avoid interference with a turning of pages in the spiral notebook.

* * * * *